May 12, 1959 A. DAUMAN 2,886,182
COUNTER RACK
Filed March 29, 1956
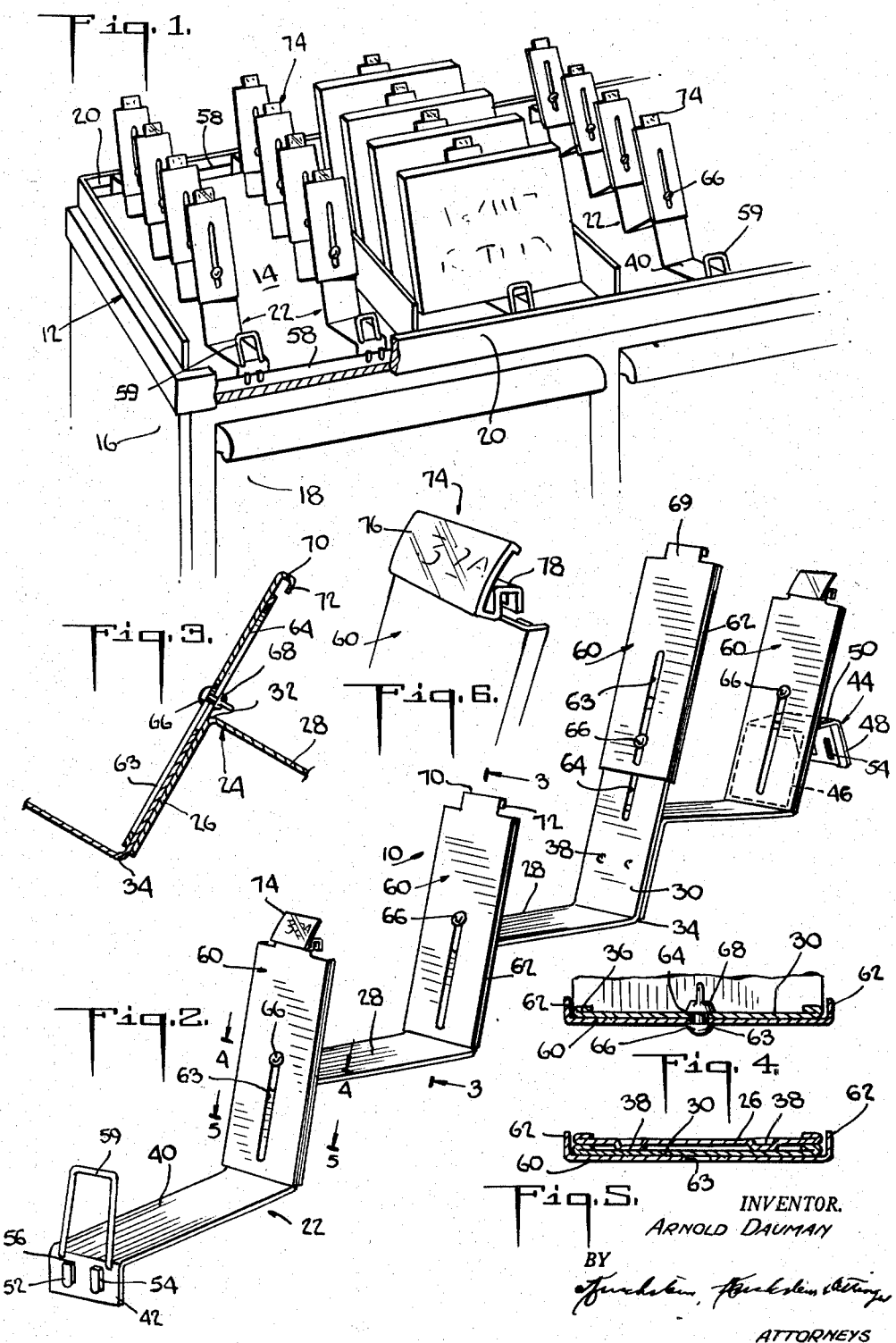
INVENTOR.
ARNOLD DAUMAN
BY
ATTORNEYS

United States Patent Office 2,886,182
Patented May 12, 1959

2,886,182

COUNTER RACK

Arnold Dauman, Yonkers, N.Y., assignor to Stamford Metal Specialty Co., Inc., New York, N.Y., a corporation of New York Application March 29, 1956, Serial No. 574,667

8 Claims. (Cl. 211—49)

This invention relates to a counter rack, the same constituting a form of display stand adapted to be placed on a wide counter top and to subdivide the top into small sections each of which is adapted to hold an item of prepackaged goods.

It is an object of my invention to provide a device of the character described which is very simple to use and can be adjusted quickly to accommodate packages of different heights. It is another object of my invention to provide a device of the character described which is neat and attractive. It is a further object of my invention to provide a device of the character described which can be used in conjunction with other similar devices and can be joined thereto so that they act mutually as a single large unit. It is an additional object of my invention to provide a device of the character described which is adapted to be securely anchored to a counter top with a minimum of effort. It is still another object of my invention to provide a device of the character described which constitutes relatively few and simple parts and can be manufactured at a low cost. It is an ancillary object of my invention to provide a device of the character described which is particularly adapted to bear detachable price markings so that each of the several different items of prepackaged goods can be properly tagged for sale.

Other objects of my invention in part will be evident and in part will be pointed out hereinafter.

My invention accordingly consists in the features of construction, combination of elements and arrangement of parts which will be exemplified in the device hereinafter described and of which the scope of application will be indicated in the appended claims.

In the accompanying drawings in which is shown one of the various possible embodiments of my invention:

Fig. 1 is a perspective view of a counter top on which are arranged several racks constructed in accordance with the present invention;

Fig. 2 is a perspective view of one of said racks;

Fig. 3 is a sectional view taken substantially along the line 3—3 of Fig. 2;

Figs. 4 and 5 are enlarged sectional views taken substantially along the lines 4—4 and 5—5, respectively, of Fig. 2; and Fig. 6 is an enlarged perspective view of the top of one of the backs of the rack together with the associated price marker.

Referring now in detail to the drawings, the reference numeral 10 denotes a counter rack embodying my invention. Said rack is adapted to be placed on a wide counter top 12 of conventional construction and constituting by way of example, a flat horizontal top surface 14 supported by side and front walls 16, 18 as well as a back wall (not shown). The counter top may be provided with upstanding guard rails 20 on all four sides thereof, although this is not necessary to the practice of my invention. It is conventional in the trade to provide counter tops having standardized depths, that is to say, counter tops the distances of which from the fronts to the backs thereof, are equal to one of a few standard lengths. Racks 10 embodying my invention are of such lengths that they will fit these standardized depths. Thus, one rack is dimensioned to fit a counter top of one size and another rack will be dimensioned to fit another size counter top, etc.

The rack 10 includes a zig-zag base 22 consisting of a series of Z shaped members 24 (see Fig. 3) each having an upwardly and rearwardly extending front flat leg 26, a downwardly and rearwardly extending flat leg 28 and an upwardly and rearwardly extending back flat leg 30. The front upper end of the central leg 28 is integrally connected to the upper end of the front leg 26 by a corner 32. Similarly, the back lower end of the central leg 28 is integrally connected to the lower end of the back leg 30 by a corner 34. The front and back legs 26, 30 are parallel to one another and preferably the central leg 28 is perpendicular to said front and back legs. The members 24 may be made of sheet metal and to stiffen the same preferably are provided with retroverted edge portions 36. To make up a base 22 several Z shaped members 24 are securely connected to one another as by welding. The front leg 26 of one member is placed in back of the back leg 30 of another member and is secured thereto as by spot welding 38. The lower end of the front leg 26 is located adjacent the corner 34 joining the back leg to the central leg. The side edges of the front and back legs thus secured to one another, are registered so that, in effect, the two legs form a thick back wall for a compartment of the rack.

The length of each of the back legs considerably exceeds the length of the associated front leg lying immediately behind it so that each back leg protrudes into the air above the central leg of the Z shaped member immediately behind it, thereby subdividing the length of the rack into several unit compartments each adapted to hold a different size of the same article of merchandise or different articles of merchandise.

It will be appreciated that by selecting the proper front to back lengths for each of the Z shaped members 24 and by selecting the proper number of such members the rack may be arranged to fit any given standard size of counter depth.

The foremost Z shaped member is slightly modified inasmuch as it is not connected to a member in front of it. More specifically, said foremost member, which is referred to in the drawings by the reference numeral 40, has central and back legs which are identical in size and shape with the central and back legs of the other members, but a differently designed front leg 42. Said front leg, instead of being parallel to the back leg, as is the case with the other members, preferably is approximately vertical. Moreover, said front leg is shorter than the other front legs, thereby to enable the same to be concealed behind the front guard rail 20 so that the rack will not be exposed to view and detract from a pleasing display of the merchandise. Due to this lesser height of the front leg of the foremost Z shaped member 40, the orientation of the central leg 28 of said member is somewhat less steep than that of the remaining members. However, this does not noticeably affect the display of the merchandise inasmuch as, as soon will be seen, all the packages of merchandise are arranged at the same angle, which is the angle of the back walls 30. The only difference between packaged merchandise in the foremost compartment and that in the remaining compartments is that there will be a slightly stepped appearance to the top edges of the packages in the foremost compartment, whereas the top edges of the packages in the remaining compartments are flush.

As a further means for permitting variation, during manufacture, of the over all length of the rack, I have provided a back stop 44 of generally U-shaped configuration. Said back stop includes a front wall 46 joined to a back wall 48 by a top wall 50. The back stop likewise is preferably manufactured from sheet metal with retroverted side edges for strength. The inclination of the front wall 46 matches that of the back wall 30 of the rearmost Z-shaped members and said two walls are permanently joined to one another as by spot welding. The rear wall 48 is preferably vertical although, since it ordinarily will not be seen, its orientation is not of great importance. The inclination of the top wall 50 likewise is not important and will be governed by the heights of the front and back walls both of which are made comparatively short for economy of material.

In accordance with an ancillary feature of my invention I provide the rack with means for enabling flanking racks to be rapidly, yet securely, interconnected for use as a unit. As shown herein, such means simply comprises a pair of clips 52 carried by the front leg 42 of the foremost Z-shaped member and a similar pair of clips carried by the rear leg 48 of the back stop. Each clip constitutes a tang struck from its supporting wall as a single piece leaving behind an opening 54. A base of the tang is at right angles to the wall and is joined by a bend 56 to a downwardly depending leg parallel to and spaced from the associated wall. The tangs of each pair of clips are horizontally registered and similarly spaced from their associated wall. Due to their construction it will be appreciated that the legs of the clips may be urged away from the wall and will be resiliently biased back to an unstressed position.

Advantage is taken of such construction to join flanking racks. To this end, I provide a tie bar such as a narrow thin metal bar 58 having a portion thereof frictionally engaged by a pair of clips at the front of one rack and another portion thereof frictionally engaged by a pair of clips at the front of a flanking rack. Optionally, more than two racks can thus be connected to the same set of front and back tie bars.

Alternatively, the clips may be utilized to secure the racks to a counter. Where such arrangement is employed, the counter is provided with a bar, such as the tie bar, which is affixed, as by screws, to the inner sides of the front and back guard rails, but slightly spaced therefrom, where they are adapted to be engaged by the front and back clips. The tie bars, or bars affixed to the guard rails, are slightly thicker than the spacing between the clips and the adjacent walls so that when the bars are engaged by the clips, the clips will be stressed to resiliently grip the bars.

It will be observed that because the front leg 42 of the foremost Z-shaped member 40 is not connected to a dividing partition constituting the back leg of another member in front of it, there may be a tendency for packaged goods located in the foremost compartment to fall forwardly. Accordingly, I provide suitable means to prevent this, such means acting as a front abutment for the foremost compartment. The aforesaid means comprise a U-shaped inverted wire bail 59 having its ends permanently engaging the front corner 32 of the foremost Z-shaped member 40. The bail is inclined rearwardly at an angle equal to the angle of all of the back legs 30. It will be apparent that the bail acts as a front abutment means for packages located in the foremost compartment. However, since it is comparatively low and is formed of wire, it will not detract from the over all appearance of merchandise displayed in the rack.

The rack further includes means to vary the height of the back wall of each of the compartments and thereby to enable the compartments to accommodate prepackaged goods of various lengths (heights). More particularly, I provide in association with each of the back legs 30 an extensible panel 60. Said panel is fabricated from sheet metal and constitutes an oblong piece of material having rearwardly directed side flanges 62 which ride on the side walls of the composite back of each compartment constituting the two joined flat legs 26, 30 of adjacent members 24. The flanges serve to guide the panel 60 in a generally vertical direction parallel to the pair of joined legs which carry the panel. Desirably, the length of the panel is approximately equal to the length of the associated back leg 30 so that the panel and said leg can be fully telescoped. It will be clear that by sliding the panel 60 upwardly the effective length of the back of each of the unit compartments can be extended accordingly.

The rack is provided with means to releasably secure the panel 60 in any extended position. As herein illustrated, such means comprises an elongated slot 63 in and parallel to the longitudinal axis of the panel 60 and a matching slot 64 in and parallel to the longitudinal axis of the leg 30. The slot 64 of the leg 30 has its lower end adjacent the corner 32 of the member 24 immediately in back of said leg and its upper end near the top of the leg 30. The slot 63 in the panel 60 extends from the adjacent the bottom of said panel to a point more than half way up the panel. A machine bolt 66 has its shank extending through said slots with the head of the bolt seated against the front of the panel 60. A butterfly nut 68 engages the rearwardly extending threaded shank of the bolt. It will be understood that by tightening the nut the panel 60 can be secured in any adjusted relationship with respect to the leg 30.

Each compartment of the rack includes suitable means for facilitating display of a price tag or other marking, e.g., a size marking. Such means constitutes a broad tongue 69 integral with the panel 60 and extending upwardly from the central portion of the top edge thereof. The tongue has a rearwardly extending flange 70 at its upper edge and a finger 72 which extends downwardly from the back edge of the flange. The tongue with its flange and finger function as a rail for supporting a marking element such, for instance, as the marker 74, which is a standard commercial marker. Said marker essentially constitutes a display section 76 connected to a U-shaped downwardly facing channel 78 that engages the supporting rail. The rail is slightly wider than the channel so that the two parts are adapted to be detachably secured to one another. The marker 74 is made of a resilient sheet material such, for instance, as a relatively thick (e.g., 1/16 of an inch) sheet of a synthetic plastic material (e.g., an acrylic resin) so that the channel can spread to receive the rail. A suitable piece of paper or the like carrying the desired price or size marking is secured in back of the display section 76 as is well known.

It thus will be seen that I have provided a device which achieves the several objects of my invention and is well adapted to meet the conditions of practical use.

As various possible embodiments might be made of the above invention and as various changes might be made in the embodiment above set forth, it is to be understood that all matter hereinabove described and shown in the accompanying drawings is to be interpreted as illustrative and not in a limiting sense.

Having thus described my invention, I claim as new and desire to secure by Letters Patent:

1. A counter rack comprising a zig-zag base including a plurality of similar Z-shaped members, each member having a rearwardly and upwardly sloping front leg joined by a rearwardly and downwardly sloping central leg to a rearwardly and upwardly sloping rear leg, said Z-shaped members being arranged end to end with the front leg of each member located in back of and associated with the rear leg of the member in front of it, and means joining the associated pairs of legs of different members to one another, said rearwardly and upwardly sloping rear legs being longer than said rearwardly and upwardly sloping front legs and extending above said front legs to provide free upstanding elongated elements.

2. A counter rack as set forth in claim 1 wherein there are provided upwardly protruding panels slidably mounted on said rear legs.

3. A counter rack as set forth in claim 2 wherein each panel includes means for mounting a marker thereon.

4. A counter rack comprising a zig-zag base including a plurality of similar Z-shaped members, each member having a rearwardly and upwardly sloping front leg joined by a rearwardly and downwardly sloping central leg to a rearwardly and upwardly sloping rear leg, said Z-shaped members being arranged end to end with the front leg of each member located in back of and associated with the rear leg of the member in front of it, means joining the associated pairs of legs of different members to one another, said rearwardly and upwardly sloping rear legs being longer than said rearwardly and upwardly sloping front legs and extending above said front legs to provide free upstanding elongated elements, and a substantially vertical member extending downwardly from the front edge of the foremost Z-shaped member.

5. A counter rack as set forth in claim 4 wherein there is provided a back stop secured to the rear edge of the rearmost Z-shaped member.

6. A counter rack comprising a zig-zag base including a plurality of substantially parallel rearwardly and upwardly sloping legs joined by a plurality of intermediate rearwardly and downwardly sloping straight legs, a plurality of elongated elements, each rearwardly and upwardly sloping leg including in fixed relationship therewith a different elongated element extending upwardly substantially above the intermediate legs, a plurality of panels each extending upwardly from a different one of the elongated elements, means mounting each panel for slidable movement on its associated elongated element in a direction parallel to the plane of said element, and means detachably holding each panel to its associated element.

7. A counter rack comprising a zig-zag base including a plurality of similar Z-shaped members, each member having a rearwardly and upwardly sloping front leg joined by a rearwardly and downwardly sloping central leg to a rearwardly and upwardly sloping rear leg, said Z-shaped members being arranged end to end with the front leg of each member located in back of and associated with the rear leg of the member in front of it, means joining the associated pairs of legs of different members to one another, said rearwardly and upwardly sloping rear legs being longer than said rearwardly and upwardly sloping front legs and extending above said front legs to provide free upstanding elongated elements, and members extending downwardly from the front of the foremost Z-shaped member and the rear of the rearmost Z-shaped member, said downwardly extending members having downwardly extending integral clips adapted to engage a pair of independent interconnecting tie bars.

8. A counter rack comprising a zig-zag base including a plurality of substantially parallel rearwardly and upwardly sloping legs joined by a plurality of intermediate rearwardly and downwardly sloping straight legs, a plurality of elongated elements, each rearwardly and upwardly sloping leg carrying a different elongated element, and downwardly extending members on the front and back of the base, said downwardly extending members having downwardly extending integral clips adapted to engage a pair of independent interconnecting tie bars, each clip including a tang projecting downwardly away from the associated downwardly extending member and having a portion substantially parallel to said member.

References Cited in the file of this patent

UNITED STATES PATENTS

| | | |
|---|---|---|
| 1,560,009 | Wobber | Nov. 3, 1925 |
| 1,604,509 | Caldwell | Oct. 6, 1926 |
| 1,659,509 | Ashbrook | Feb. 14, 1928 |
| 1,997,829 | McKee | Apr. 16, 1935 |
| 2,006,680 | Kohlhoff | July 2, 1935 |
| 2,147,759 | Sulentic | Feb. 21, 1939 |
| 2,160,050 | Wolf | May 30, 1939 |
| 2,193,889 | Sliger | Mar. 19, 1940 |
| 2,560,161 | Fay et al. | July 10, 1951 |

FOREIGN PATENTS

| | | |
|---|---|---|
| 107,039 | Australia | Apr. 6, 1939 |